(12) United States Patent
Wieclawski

(10) Patent No.: US 7,204,554 B2
(45) Date of Patent: Apr. 17, 2007

(54) SWIVEL SEAT

(75) Inventor: Stanislaw Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 88 days.

(21) Appl. No.: 10/987,460

(22) Filed: Nov. 12, 2004

(65) Prior Publication Data
US 2005/0116520 A1 Jun. 2, 2005

(30) Foreign Application Priority Data
Nov. 28, 2003 (DE) .......................... 203 18 391 U

(51) Int. Cl.
A47C 1/00 (2006.01)
(52) U.S. Cl. .............................. 297/344.21; 297/344.24
(58) Field of Classification Search ........... 297/344.21, 297/344.24, 344.26; 296/65.01
See application file for complete search history.

(56) References Cited

U.S. PATENT DOCUMENTS

| | | | | |
|---|---|---|---|---|
| 2,822,858 A | * | 2/1958 | Mussler | 296/68 |
| 2,992,852 A | * | 7/1961 | Loofbourrow et al. | 296/68 |
| 3,013,837 A | * | 12/1961 | Pessl et al. | 296/68.1 |
| 3,051,522 A | * | 8/1962 | Myers | 296/68 |
| 3,951,449 A | * | 4/1976 | Crowther | 297/142 |
| 4,600,239 A | | 7/1986 | Gerstein et al. | |
| 4,733,903 A | * | 3/1988 | Bailey | 296/65.07 |
| 4,846,529 A | | 7/1989 | Tulley | |
| 4,971,392 A | | 11/1990 | Young | |
| 4,971,394 A | * | 11/1990 | Vanderminden | 294/344.21 |
| 5,183,312 A | | 2/1993 | Nania | |
| 5,318,339 A | | 6/1994 | Cherniak | |
| 5,441,329 A | | 8/1995 | Janisch | |
| 5,465,441 A | | 11/1995 | Chun | |
| 5,474,353 A | * | 12/1995 | Koester et al. | 296/65.07 |
| 5,651,576 A | * | 7/1997 | Wallace | 296/65.11 |
| 5,762,398 A | | 6/1998 | Gonzalez et al. | |
| 6,027,170 A | * | 2/2000 | Benz et al. | 297/344.21 |
| 6,199,949 B1 | * | 3/2001 | DaSilva | 297/256.12 |
| 6,241,314 B1 | | 6/2001 | Pufall | |
| 6,431,647 B2 | | 8/2002 | Yamazaki | |
| 6,520,579 B2 | | 2/2003 | Kassai et al. | |
| 6,547,303 B1 | * | 4/2003 | Anderson | 296/68 |
| 6,572,189 B1 | | 6/2003 | Blaymore | |
| 2001/0004162 A1 | | 6/2001 | Yamazaki | |
| 2001/0048237 A1 | | 12/2001 | Kassai et al. | |

FOREIGN PATENT DOCUMENTS

| | | |
|---|---|---|
| DE | 2545742 | 4/1977 |
| DE | 3320989 A1 | 12/1984 |
| DE | 10120769 A1 | 10/2002 |
| JP | 8-289904 | 11/1996 |
| JP | 9-183325 | 7/1997 |
| RU | 2 180 624 C1 | 3/2002 |

* cited by examiner

Primary Examiner—David R. Dunn
Assistant Examiner—Sarah B. McPartlin
(74) Attorney, Agent, or Firm—Brooks Kushman P.C.

(57) ABSTRACT

A vehicle swivel seat (1) includes a vehicle mounted base frame (2) for carrying a seat member (3) and a backrest (4) that can be pivoted relative to the base frame (2) about a substantially vertical pivot axis (5) which is arranged in eccentrically offset fashion toward a seat outside (6) oriented toward an associated vehicle door.

21 Claims, 4 Drawing Sheets

SWIVEL SEAT

BACKGROUND OF THE INVENTION

1. Field of the Invention

The present invention relates to a swivel seat with a base frame for mounting in a vehicle, the base frame carrying a seat member and a backrest being coupled to the base frame.

2. Background Art

Such a swivel seat is e.g. known from U.S. Pat. No. 4,846,529. In this swivel seat, the base frame is configured to rotate directly relative to a vehicle bottom. To this end a column-like rotating device is arranged between vehicle bottom and base frame. The adjustment of the seat member and the backrest, respectively, relative to the base frame is still carried out between said members, the swivel seat being rotatably supported on the whole.

The constructional expense in this prior-art swivel seat is relatively high because the swivel seat is supported in the vehicle in a way completely different from the one used in standard seats; to this end, both additional means and considerable modifications are required on both the base frame of the seat and the vehicle bottom.

The prior-art swivel seat can be pivoted about a vertical pivot axis which is arranged substantially in the center relative to the seat member. The outsides of the seat move accordingly along a corresponding circular path about said pivot axis. This may have the effect that the seat can only be pivoted if seat member and backrest are in their initial positions, i.e. the backrest is aligned as vertically as possible, and the seat member is substantially arranged in the center above the base frame, i.e., it is not shifted in driving direction relative to the base frame.

SUMMARY OF THE INVENTION

It is therefore the object of the present invention to improve a swivel seat of the above-mentioned type such that the seat can also be pivoted with seat member and backrest in the shifted or pivoted state while the constructional efforts are small and little space is needed.

According to the invention seat member and backrest are pivoted directly relative to the base frame about a substantially vertical pivot axis. As a result, the base frame can be fastened in the standard way to the vehicle bottom and there supported for adjusting the swivel seat in driving direction. No special constructional changes are required on the vehicle bottom or on the bottom side of the base frame oriented towards the vehicle bottom.

At the same time, the pivot axis is arranged according to the invention to be eccentrically offset towards an exterior side of the seat oriented towards an associated vehicle door. This simple and efficient measure has the effect that the seat contour, almost independently of the position of the seat relative to the vehicle, does not collide with other means inside the vehicle. This arrangement of the pivot axis, which is eccentrically offset towards the vehicle door, has also the effect that in the pivoted state of the seat member said member projects at least in part out of the vehicle opening and assists a passenger in entering or leaving the vehicle.

It is possible to arrange the pivot axis relative to the seat in various ways. For reasons of stability, however, it may be regarded as an advantage when the pivot axis extends substantially along the seat outside. The pivot axis is thereby arranged substantially in the area of corresponding frame members of the swivel seat that extend in driving direction. The pivot axis is here arranged such that it is still within the contour of the swivel seat or, at least optically, cannot be perceived in a negative way.

The pivot axis can be arranged along the whole seat outside at a corresponding place. A constructionally simple and sufficiently stable arrangement of the pivot axis may be achieved when said axis is arranged next to a coupling point of the backrest on the base frame. As a consequence, the pivot axis is arranged substantially next to a B column of a vehicle.

To separate the pivotability of the swivel seat from the otherwise standard adjustability of at least the seat member through the base frame, said member may comprise a bottom frame and an intermediate frame. The bottom frame serves the usual adjustment of the seat member particularly in driving direction, and the intermediate frame serves the pivoting of seat member and backrest about the pivot axis. If in the swivel seat it is additionally possible to adjust inclination or height of the seat member, this is also accomplished through a corresponding adjustment of the bottom frame. Although the intermediate frame is normally adjusted together with the bottom frame in a corresponding way, seat member and backrest are pivoted relative to the bottom frame via the corresponding pivotable support of the intermediate frame.

Pivoting of seat member and backrest about the substantially vertical pivot axis is thus decoupled from the other possibilities of adjusting the swivel seat. Of course, attention must here be paid that the pivot axis is inclined, e.g. depending on the inclination of the seat member, possibly in accordance with the vertical.

To connect the intermediate frame in a simple way at the one side to the bottom frame and at the other side to the seat member and backrest, the intermediate frame may be bipartite, consisting of support frame member and of pivot frame member pivotably supported on said support frame member about the pivot axis, the pivot frame member carrying the seat member and the backrest being coupled to the pivot frame member. No constructional changes are thus needed on the bottom frame, for instance, to realize the pivot axis because said axis is provided between the two members of the intermediate frame.

Moreover, the bipartite configuration of the intermediate frame simplifies adaptation relative to the bottom frame and also relative to the seat member and the backrest, respectively, and simultaneously increases the stability of the swivel seat on the whole.

For reasons of safety it may be regarded as an advantage when the pivotability of the pivot frame member about the pivot axis is fixed to a small pivot range during driving with the vehicle. If the corresponding swivel seat is e.g. intended for a front-seat passenger, a certain pivotability of the swivel seat may certainly be desirable for said person also during driving. By contrast, for the driver, it is normally necessary for reasons of safety that the pivot frame member is detachably locked on the support frame member in a driving position where they are aligned relative to one another in driving direction. The corresponding members can thus not be pivoted relative to one another. Also for the front-seat passenger, the corresponding pivot range may be limited during driving such that at least not a collision with vehicle door or driver seat or transmission tunnel is possible.

A simple possibility of locking the driving position may be seen when a locking element is arranged on the pivot frame member and a counter-locking element on the support frame member. These are in fixed engagement with one another in the driving position, so that the two members cannot be pivoted relative to one another. By contrast, a certain pivot range is also allowed during driving in the case of the front passenger seat or also in the case of other seats of the vehicle by the locking element and counter-locking element. It is also possible to allow for one or several intermediate positions in the pivot area and optionally to lock the same.

Pivot and support frame members may be of a relatively simple construction and their dimensions are substantially adapted to bottom frame and seat member. In a simple embodiment pivot and support frame member are substantially U-shaped with connection carriers extending between the two end sections of the U-legs. This yields a closed profile of adequate strength and stability.

Advantageously, the pivot pin may project in the area of a free end section of one U-leg of the pivot frame member towards the support frame member. The pivot pin is pivotably supported on the support frame member in a corresponding way.

To be in a position to arrange the pivot pin even more off-center, particularly with respect to padding and side lining of the swivel seat, said pin may be arranged at a distance from an outside of the U-leg and particularly detachably be secured thereto.

The distance between pivot pin and U-leg can here be exploited to arrange a coupling flange member of the backrest between support pin and U-leg and to fasten the same particularly detachably at said place. Opposite to the support pin, a further coupling flange member for the backrest may be arranged on the other U-leg of the pivot frame member.

The coupling flange members may be pre-mounted on the pivot frame member, so that upon installation of the swivel seat the backrest may be fastened accordingly to the coupling flange members.

For a simple support of the pivot pin it may be regarded as an advantage when a pivot pin receiving means is laterally fixed to the support frame member in a particularly detachable manner. Said means may be arranged and constructed such that it does not impede a fastening of the support frame member to the bottom frame in any way.

To prevent an increase in the constructional height of the swivel seat in comparison with non-pivotable seats due to the arrangement of the intermediate frame consisting of pivot frame member and support frame member, the pivot frame member may be arranged at least in part in countersunk fashion in an underside of the seat member.

To permit an easy unlocking of the swivel seat, a mechanical unlocking means may be arranged for unlocking the locking and counter-locking element on the seat member. This facilitates the accessibility of the unlocking means and such a means need not be groped for on the bottom frame, or the like. The unlocking means is here normally arranged along the side surfaces of the seat member.

For enhancing the stability of the swivel seat it is possible to connect not only the support frame member directly to the bottom frame, but to secure the support pin receiving means, particularly detachably, in addition to the remaining support frame member, to the bottom frame. Support pin receiving means and, for instance, U-leg of the support frame member may also be arranged spaced apart from one another, so that a corresponding longitudinal carrier of the bottom frame can be arranged thereinbetween and screwed to both members or detachably fastened in another way.

To prevent accidental disengagement of locking and counter-locking element during driving of the vehicle in a simple way, the unlocking means may comprise a release handle provided on the seat outside facing the vehicle door. Said handle may e.g. be designed as a grip bracket which is spring-loaded in a direction opposite to the unlocking direction.

An inexpensive and, nevertheless, sufficiently stable material for the intermediate frame, which is relatively lightweight at the same time, may be aluminum or cast aluminum, which are used as the basic material for support and pivot frame members. Other materials, such as steel or the like, are also possible.

A simple embodiment of the corresponding unlocking means may be seen in a configuration where the release handle is kinetically connected via a Bowden cable to the locking or counter-locking element for pivoting between locking and unlocking position. With a corresponding deflection of the release handle, the locking and counter-locking element, respectively, are adjusted by analogy through the connection via the Bowden cable to such an extent that the pivot frame member can then be pivoted relative to the support frame member in the unlocked position. Other connections, instead of a Bowden cable, are also possible.

To automatically secure the driving position, locking and counter-locking elements may be spring-loaded towards the locking position, so that said elements automatically assume the locking position when the pivot frame member is pivoted back into the driving position.

Instead of mechanical unlocking, it is also possible to carry out such an unlocking electrically via corresponding servomotors, or the like. It is also possible to pivot the pivot frame member relative to the support frame member electrically.

To prevent the swivel seat from pivoting back into its driving position automatically and to assist in entering or leaving the vehicle, the pivot frame may be detachably fixed at least in its swung out position. Such a fixation is also possible again relative to the support frame member. An unlocking of the swung out position is also possible through a corresponding unlocking means. Said means may also serve to unlock both the swung out position and the driving position. A corresponding locking and unlocking may also be provided for further intermediate positions between driving position and swung out position.

To permit a mounting of the intermediate frame in a simple and fast way, fastening means may be formed on pivot and/or support frame member for detachably fastening the seat member, and on the bottom frame, respectively.

The corresponding fastening means may be configured in this respect such that they match already existing fastening means on the seat member, on the backrest and/or on the bottom fame, said fastening means otherwise possibly serving a direct fastening of seat member and backrest on the bottom frame. It is e.g. possible that pivot and support frame member are designed as a retrofit module and that a corresponding conversion into a swivel seat is possible without constructional changes on the already existing seat.

It should here be noted that the subject matter of the invention is also such a retrofit module for a vehicle seat with pivot and support frame member, as have been described above.

BRIEF DESCRIPTION OF THE DRAWINGS

An advantageous embodiment of the invention shall now be explained in more detail with reference to the figures attached to the drawing, of which.

An advantageous embodiment of the invention shall now be explained in more detail with refrence to the figures attached to the drawing, of which

DETAILED DESCRIPTION OF THE PREFERRED EMBODIMENT(S)

Figure 1:
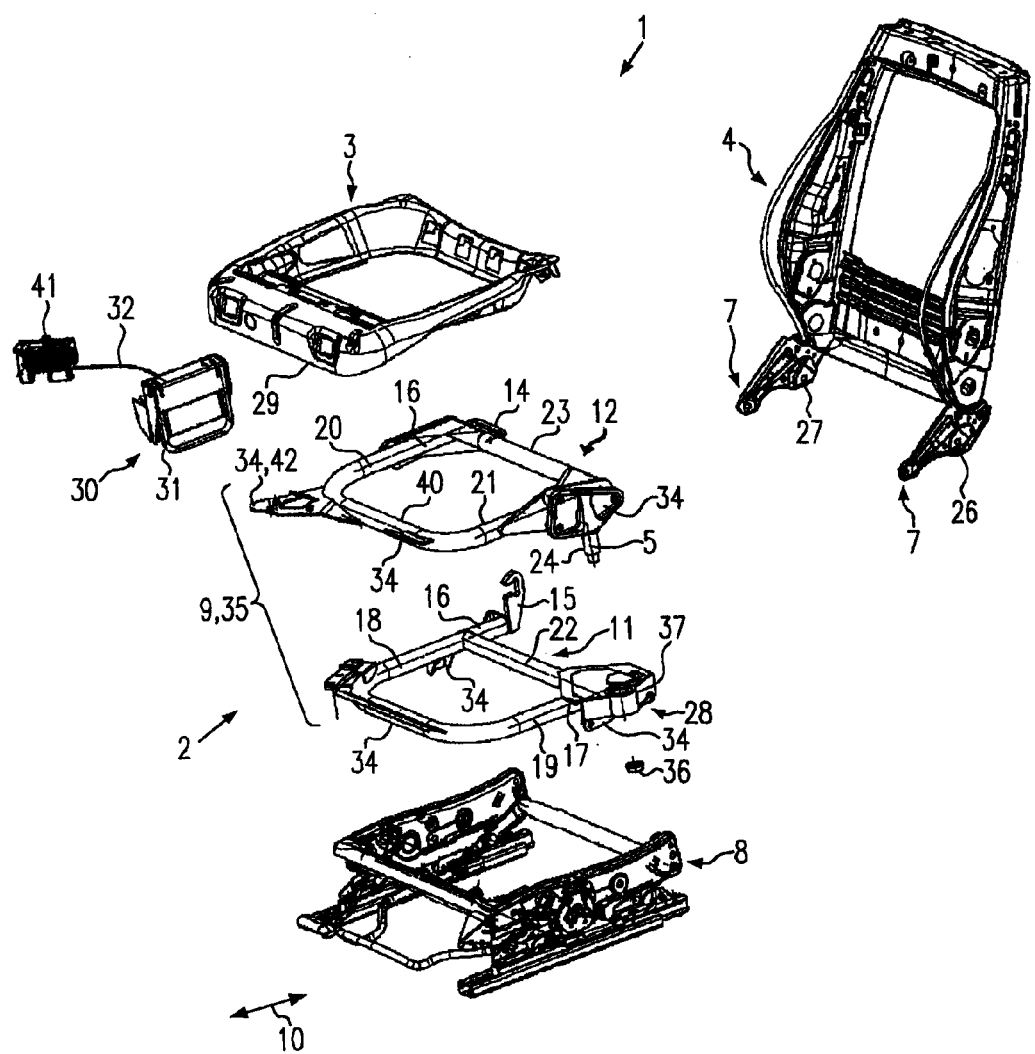
FIG. 1 shows a swivel seat in an exploded view.

FIG. 1 is a perspective view showing a swivel seat 1 illustrated in an exploded view. The swivel seat 1 comprises a backrest 4 which is coupled to the intermediate frame 9 by means of coupling flanges 26, 27. Corresponding padding and lining have been removed from both the backrest 4 and the seat member 3. At their free ends, the corresponding coupling flanges 26, 27 form coupling points 7 at which the backrest 4 is coupled to the intermediate frame 9.

Seat member 3 has a substantially square frame with seat outside 6 and bottom side 29. The seat member 3 is detachably secured to the intermediate frame 9. In one embodiment of the invention, the intermediate frame 9 is designed as a retrofit module 35 and comprises a support frame member 11 and a pivot frame member 12 as well as an unlocking means 30.

The pivot frame member 12 is substantially U-shaped, comprising two U-legs 20, 21, a U-web 40 connecting said U-legs, and a connection carrier 23 connecting free end sections 16 of the U-legs 20, 21. At some places of the pivot frame member 12, fastening means 34 are arranged for fastening the seat member 3 and for fastening the coupling flange members 26, 27 of the backrest 4.

At the free end sections 16, a pivot pin 24 with a vertical pivot axis 5 is arranged on one outside of the U-leg 21. The pivot pin 24 is spaced apart from the outside 25, see also FIG. 2, of the corresponding U-leg, leaving a free space thereinbetween for receiving the coupling flange member 26. Both the fastening means 34 next to the pivot pin 24 and the outside of the U-web 21 are detachably connectable to the coupling flange member 26.

At the end of the free end section 16 of the U-leg 20, a ball-shaped locking element 14 is arranged. Said element cooperates with a counter-locking element 15 on the support frame member 11 for fixing a driving position 13, see FIG. 2.

Figure 3:
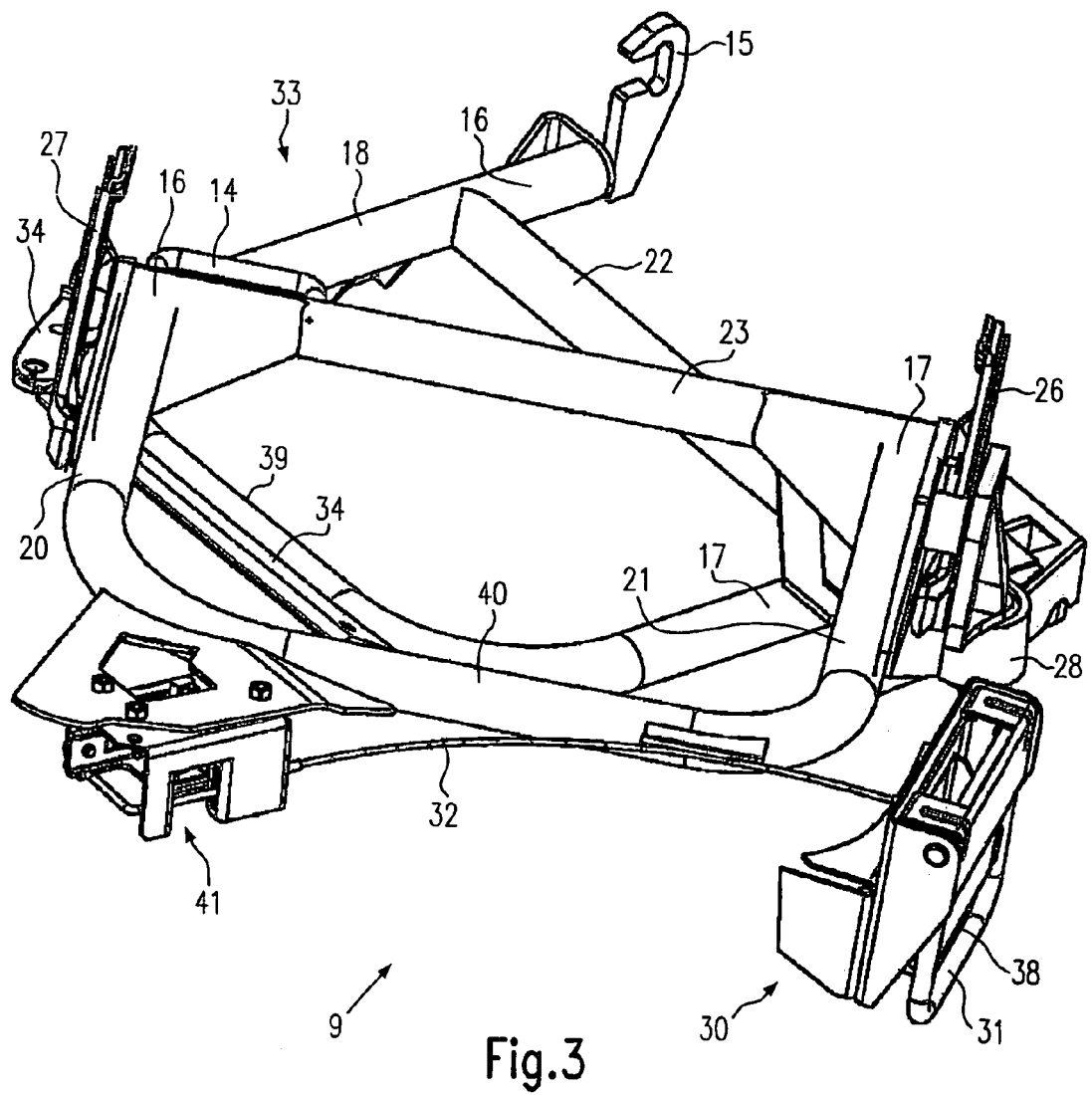
FIG. 3 shows the intermediate frame of FIG. 2 in the swung out position of the pivot frame member.

Support frame member 11 is also substantially U-shaped, comprising U-legs 18, 19 and U-web 39, see also FIG. 3. Free end sections 16 of the U-legs 18, 19 are connected to the connection carrier 22. At the free end section 17 of the U-leg 19, a pivot pin receiving means 28 is arranged with a bearing hole 37 for receiving the pivot pin 25. A fastening screw 36 is provided for fixing the pivot pin 24 in the bearing hole 37. The pivot pin receiving means 28 is also spaced apart from the outside of the U-leg 19, so that a longitudinal carrier of a bottom frame 8 can be arranged thereinbetween and detachably fastened to the two members. Further fastening means 34 for fastening the support frame member 11 to the bottom frame 8 are also provided.

Together with the intermediate frame 9, the bottom frame 8 forms a base frame 2 of the swivel seat 1, the base frame acting to carry the seat member 3 and to couple the backrest 4.

With the bottom frame 8, the swivel seat 1 is adjustable in driving direction 10. Optionally, the bottom frame 8 also serves to adjust height and inclination of the seat member 3. The inclination of the backrest 4 is adjusted relative to the coupling flange members 26, 27 in a manner known per se.

When the seat member 3 is detachably fastened, the pivot frame member 12 is countersunk at least in part in the bottom side 29 of said member 3. The unlocking means 30, see also FIGS. 2 and 3, comprises a unit 41 to be fastened to the pivot frame member 12, as well as a release handle 31 configured as a bracket, which is connected to said unit by way of a Bowden cable 32. Said release handle 31 is arranged laterally on the seat member 3 or directly below the seat member 3 in the assembled state of the swivel seat 1.

The corresponding pivot axis 5 is arranged next to the B column when the swivel seat 1 is installed in the vehicle.

Figure 2:
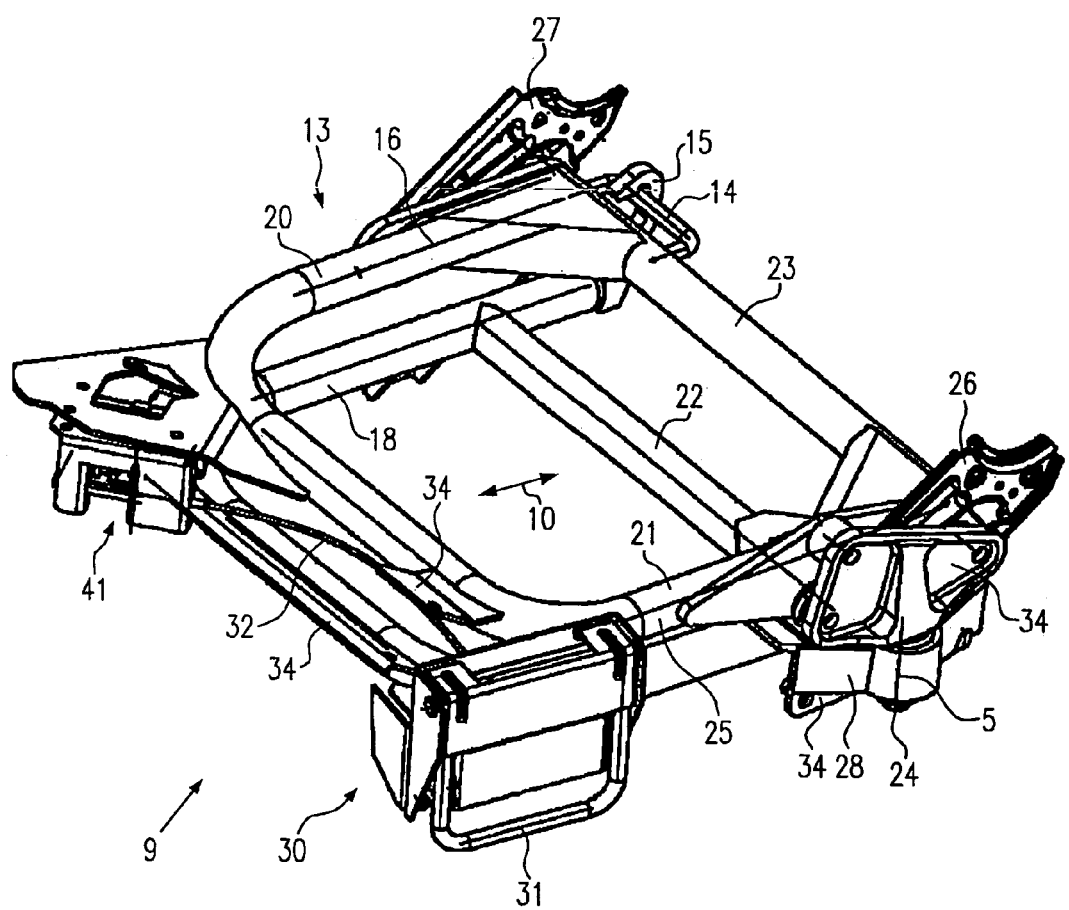
FIG. 2 shows a perspective top view on an intermediate frame consisting of pivot and support frame member, in driving position.

FIG. 2 shows the intermediate space 9 with support frame member 11 and pivot frame member 12 in a driving position 13. In said driving position, the frame members 11, 12 are aligned relative to one another and detachably connected to each other by means of locking element 14 and counter-locking element 15. For the sake of simplification, the remaining members of the swivel seat 1 of FIG. 1 are not shown in FIGS. 2 and 3, like reference numerals designating like members.

In the driving position 13, the corresponding U-legs 18, 19 and 20, 21 of the frame members 11, 12 are arranged substantially one on top of the other and in parallel with each other in driving direction 10. The coupling flange member 26 is inserted between fastening means 34 with pivot pin 2 and the U-leg 21 and detachably connected to the two members. At the opposite side on the other U-leg 20, the further coupling flange member 27 is also detachably fastened.

The various parts of support frame member 11 and pivot frame member 12 contain aluminum, possibly cast aluminum, as the basic material, so that the intermediate frame is lightweight and inexpensive.

The release handle 31 must be fastened to the seat member 3, which is not shown in FIG. 2, such that it can easily be gripped by a user of the seat. The Bowden cable 32 extends up to the connection member 41 which is fastened to a mount 42, see also FIG. 1, of the pivot frame member 12.

For unlocking the locking engagement of the elements 14, 15, the release handle 31 can be pivoted upwards in unlocking direction 38; see also FIG. 3.

In the driving position 13 according to FIG. 2, the release handle 31 is arranged between the seat member 3 and a vehicle door (not shown) so that a gripping and pivoting in unlocking direction 38 is hardly possible and the release handle 31 can only be gripped and pivoted in an easy way in the opened state of the vehicle door.

After locking element 14 and counter-locking element 15 have been unlocked, see FIG. 3, the pivot frame member 12 can be pivoted outwards about the pivot axis 5 through the door opening of the corresponding vehicle door. A maximum pivot angle in this context may e.g. range from 35° to 60° relative to the driving position.

Together with the pivot frame member 12, the seat member 3 and also the backrest 4 can be pivoted accordingly through their linkage by means of the coupling flange members 26, 27 on the pivot frame member 12.

FIG. 3 shows the intermediate frame 9 with pivot frame member 12 in the swung out position 33. As can particularly clearly be seen in this figure, the release handle 31 of the unlocking means 30 is not directly fastened to the pivot frame member 12, but is secured to the seat member 3 (not shown).

Moreover, reference is made to the preceding figures with respect to the description of FIG. 3.

The intermediate frame 9 can be installed in any vehicle as a retrofit module 35 without any change to the car body to convert a corresponding seat of the vehicle into a swivel seat. Thanks to the corresponding arrangement of the pivot axis 5 and the corresponding pivot pin 24, other parts inside the vehicle need not be changed either. Such parts might otherwise possibly collide with seat member 3 or backrest 4 when the swivel seat 1 is pivoted.

Furthermore, it is possible to fix the swivel seat in the corresponding swung out position 33, said fixation being also releasable via the release handle 31.

In the illustrated embodiment, both unlocking and pivoting of the seat can be carried out by hand. It is also possible that this is carried out electrically by way of corresponding servomotors, or the like.

Figure 4:
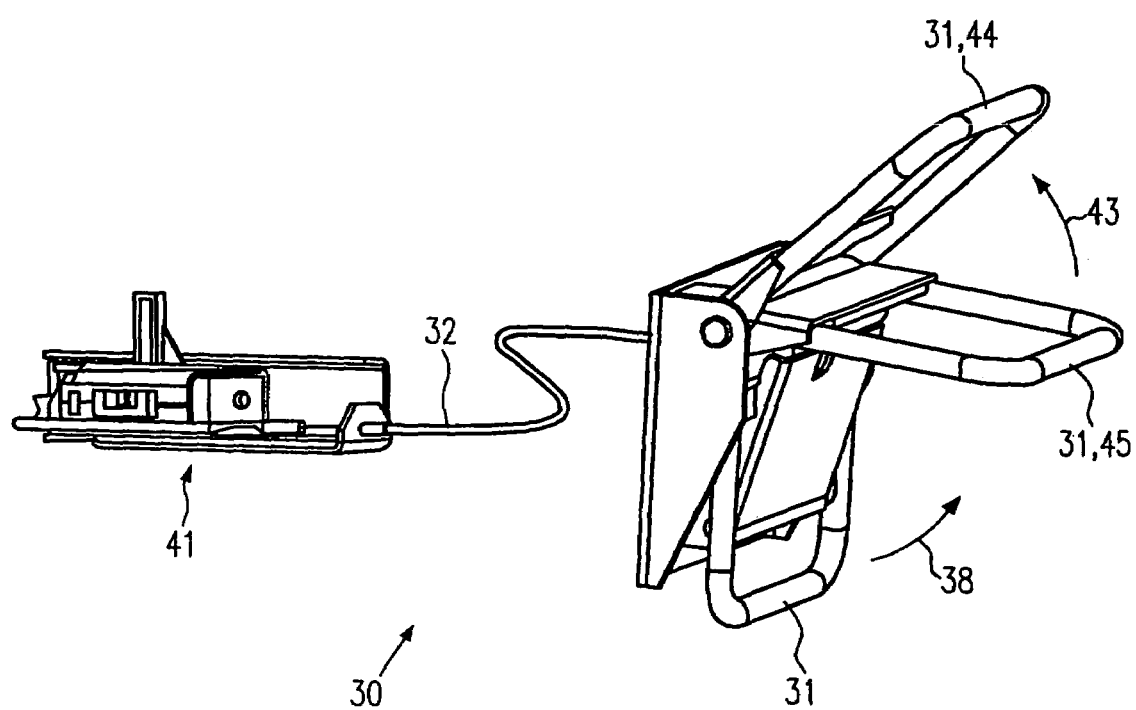
FIG. 4 shows an enlarged view of an unlocking means according to FIG. 3.

FIG. 4 shows an enlarged view of the unlocking means 30; the remaining parts of the seat have here been omitted for the sake of simplicity.

FIG. 4 shows, in particular, how the release handle 31 i208 s movable by movement in unlocking direction 38 for releasing the engagement of locking and counter-locking element 14, 15. In a laterally outwardly projecting intermediate position 45 of the release handle 31, the locking engagement is released and the release handle 31 is locked. In this position, the vehicle door cannot be closed properly because the release handle 31, see also FIG. 2, is oriented towards the vehicle door and prevents a complete closing. It is only when the release handle 31 is further moved in unlocking direction 43 to the uppermost release position 44 that the release handle 31 is unlocked, and the locking engagement of locking and counter-locking element 14, 16 can be re-established again after the seat has been rotated back into the driving position. Subsequently, the release handle 31 can return automatically and particularly by corresponding spring actuation into the downwardly oriented position of FIG. 4. In this position, the vehicle seat is locked in driving position on the one hand and the vehicle door can be closed without impediment by the release handle 31 on the other hand.

The invention claimed is:

1. A swivel seat comprising a base frame for mounting in a vehicle, the base frame carrying a seat member and a backrest characterized in that the base frame comprises a bottom frame and an intermediate frame, the bottom frame serving to adjust the seat member and the backrest in a driving direction, and the intermediate frame serving to pivot the seat member and the backrest about a substantially vertical pivot axis, the intermediate frame comprising a support frame member and a pivot frame member pivotally supported on the support frame member about the pivot axis, the support frame member having a pivot pin receiving means laterally fastened thereto, the seat member and the backrest can be pivoted relative to the support frame member about the substantially vertical pivot axis which is arranged in an eccentrically offset fashion toward a seat outside (6) oriented toward an associated vehicle door.

2. The swivel seat according to claim 1, characterized in that the pivot axis extends substantially along the seat outside.

3. The swivel seat according to claim 1, characterized in that the pivot axis is arranged next to a coupling place of the backrest on the base frame.

4. The swivel seat according to claim 1, characterized in that the intermediate frame is bipartite, and the support frame member carries the seat member and the backrest being coupled to the support frame member.

5. The swivel seat according to claim 1, characterized in that the pivot frame member and the support frame member are detachably locked in a driving position where they are aligned relative to one another in the driving direction.

6. The swivel seat according to claim 5, characterized in that for locking the driving position a locking element is arranged on the pivot frame member and a counter-locking element on the support frame member.

7. The swivel seat according to claim 6, characterized in that a mechanical unlocking means for unlocking a locking engagement of the locking element and the counter-locking element is arranged on the seat member.

8. The swivel seat according to claim 7, characterized in that the unlocking means comprises a release handle provided on the seat outside oriented towards the vehicle door.

9. The swivel seat according to claim 8, characterized in that the release handle is kinetically connected via a Bowden cable to the locking or the counter-locking elements for pivoting between locking and unlocking positions.

10. The swivel seat according to claim 9, characterized in that the locking element is spring-loaded towards the locking position.

11. The swivel seat according to claim 8, characterized in that the pivot frame member is detachably secured to the support frame member, and the release handle is connected to the locking or counter-locking elements via a cable.

12. The swivel seat according to claim 1, characterized in that the support and/or the pivot frame members are substantially U-shaped with connection carriers extending between free end sections of U-legs.

13. The swivel seat according to claim 1, characterized in that a pivot pin projects in an area of a free end section of one of a pair of U-legs of the pivot frame member towards the support frame member for forming the pivot axis.

14. The swivel seat according to claim 13, characterized in that the pivot pin is arranged at a distance from an outside of one of the U-legs.

15. The swivel seat according to claim 14, characterized in that a coupling flange member is arranged between the pivot pin and the one U-leg for coupling the backrest to the pivot frame.

16. The swivel seat according to claim 1, characterized in the pivot pin receiving means is laterally fastened to the support frame member in a detachable manner.

17. The swivel seat according to claim 16, characterized in that the pivot pin receiving means is fastened to the bottom frame in a detachable manner.

18. The swivel seat according to claim 1, characterized in that the pivot frame member is arranged at least in part in a countersunk fashion in an underside of the seat member.

19. The swivel seat according to claim 1, characterized in that the support and/or the pivot frame members is made from aluminum.

20. The swivel seat according to claim 1, characterized in that the support and the pivot frame members are designed as a retrofit module.

21. A retrofit module for a vehicle seat with the support and the pivot frame members according to claim 1.

* * * * *

UNITED STATES PATENT AND TRADEMARK OFFICE
CERTIFICATE OF CORRECTION

| | |
|---|---|
| PATENT NO. | : 7,204,554 B2 |
| APPLICATION NO. | : 10/987460 |
| DATED | : April 17, 2007 |
| INVENTOR(S) | : Stanislaw Wieclawski |

It is certified that error appears in the above-identified patent and that said Letters Patent is hereby corrected as shown below:

Column 8, Line 47, Claim 16:

Delete "laterally".

Signed and Sealed this

Seventh Day of August, 2007

JON W. DUDAS
*Director of the United States Patent and Trademark Office*